United States Patent
Zhang et al.

(10) Patent No.: US 7,155,331 B1
(45) Date of Patent: Dec. 26, 2006

(54) METHOD OF PREDICTION OF NOX MASS FLOW IN EXHAUST

(75) Inventors: Wenzhong Zhang, Savage, MN (US); Theodore G. Angelo, St. Paul, MN (US)

(73) Assignee: Donaldson Company, Inc., Minneapolis, MN (US)

(*) Notice: Subject to any disclaimer, the term of this patent is extended or adjusted under 35 U.S.C. 154(b) by 174 days.

(21) Appl. No.: 11/012,075

(22) Filed: Dec. 14, 2004

Related U.S. Application Data

(60) Provisional application No. 60/530,174, filed on Dec. 15, 2003.

(51) Int. Cl.
*F01N 3/00* (2006.01)
*G06F 17/00* (2006.01)

(52) U.S. Cl. .......................... 701/108; 60/286; 60/301

(58) Field of Classification Search ............... 701/108, 701/109, 114; 60/274, 285, 286, 299, 301
See application file for complete search history.

(56) References Cited

U.S. PATENT DOCUMENTS

| | | | |
|---|---|---|---|
| 4,851,015 A | 7/1989 | Wagner et al. | |
| 5,219,227 A | 6/1993 | Yang et al. | |
| 5,355,973 A | 10/1994 | Wagner et al. | |
| 5,486,336 A | 1/1996 | Dalla Betta et al. | |
| 5,577,382 A | 11/1996 | Kihara et al. | |
| 5,606,856 A * | 3/1997 | Linder et al. | 60/286 |
| 5,946,906 A | 9/1999 | Akazaki et al. | |
| 6,125,629 A | 10/2000 | Patchett | |
| 6,164,063 A | 12/2000 | Mendler | |
| 6,205,773 B1 | 3/2001 | Suzuki | |
| 6,345,498 B1 | 2/2002 | Yonekura et al. | |
| 6,415,602 B1 | 7/2002 | Patchett et al. | |
| 6,470,675 B1 | 10/2002 | Lewis et al. | |
| 6,499,293 B1 | 12/2002 | Surnilla et al. | |
| 6,619,035 B1 | 9/2003 | Matsuoka et al. | |
| 6,634,345 B1 | 10/2003 | Yoshizaki et al. | |
| 6,679,051 B1 | 1/2004 | van Nieustadt et al. | |
| 6,718,772 B1 | 4/2004 | Dalla Betta et al. | |
| 6,948,308 B1 * | 9/2005 | Chandler et al. | 60/274 |
| 2002/0038543 A1 | 4/2002 | Nishimura et al. | |
| 2002/0050135 A1 | 5/2002 | Manaka et al. | |
| 2002/0184877 A1 | 12/2002 | Ishii et al. | |
| 2003/0106305 A1 | 6/2003 | Ogiso et al. | |

(Continued)

FOREIGN PATENT DOCUMENTS

EP 1 008 379 A1 6/2000

(Continued)

*Primary Examiner*—Hieu T. Vo
(74) *Attorney, Agent, or Firm*—Merchant & Gould P.C.

(57) ABSTRACT

Methods for estimating the mass flow rate of NOx in an exhaust stream by correlating the level of NOx to an engine parameter. The level of NOx can be estimated as a function of engine power, of intake pressure, of exhaust temperature, as a function of the percentage of $O_2$ in the exhaust stream, or as a combination of any of these. Once the level of NOx is approximately known, the exhaust system of the engine system can be modified to improve the removal efficiency of NOx and exhaust particulate matter from the exhaust stream. These methods for estimating the NOx mass flow rate can be used for an exhaust configuration that includes a lean NOx catalyst (LNC), a selective catalytic reduction (SCR) catalyst, or a lean NOx trap (LNT). A particulate filter can be present in the exhaust configuration.

17 Claims, 3 Drawing Sheets

U.S. PATENT DOCUMENTS

| | | |
|---|---|---|
| 2003/0121249 A1 | 7/2003 | Foster et al. |
| 2003/0126857 A1 | 7/2003 | Kitahara |
| 2003/0213235 A1 | 11/2003 | Kitahara et al. |
| 2004/0040289 A1 | 3/2004 | Mazur et al. |
| 2004/0050037 A1 | 3/2004 | Betta et al. |

FOREIGN PATENT DOCUMENTS

| | | |
|---|---|---|
| EP | 1 094 206 A2 | 4/2001 |
| EP | 1 211 394 A2 | 6/2002 |
| WO | WO 03/048536 A1 | 6/2003 |
| WO | WO 2004/046514 A1 | 6/2004 |

* cited by examiner

METHOD OF PREDICTION OF NOX MASS FLOW IN EXHAUST

This application is a utility patent application claiming priority to the provisional U.S. Patent Application Ser. No. 60/530,174 filed on Dec. 15, 2003, which application is incorporated herein by reference.

TECHNICAL FIELD

The present disclosure relates generally to exhaust systems. More particularly, the present disclosure relates to systems and methods for use in reducing diesel emissions, specifically NOx and diesel particulate emissions.

BACKGROUND

Diesel engine exhaust systems are facing increasingly stringent emission regulations, both for particulate emissions and NOx emissions. Vehicles equipped with diesel engines typically have diesel particulate filters for removing particulate matter from the exhaust stream. These filters capture carbon and hydrocarbon particulate from the exhaust. In addition to particulate filters for removing particulate matter, exhaust systems can be equipped with structures for removing other undesirable emissions such as carbon monoxide (CO), hydrocarbons (HC) and nitrogen oxides (NOx). Catalytic converters are typically used to remove CO and HC. NOx can be removed by structures such as lean NOx catalysts (LNC), selective catalytic reduction (SCR) catalysts and lean NOx traps (LNT).

Lean NOx catalysts are catalysts capable of converting NOx to nitrogen in an oxygen rich environment with the assistance of low levels of hydrocarbons. For diesel engines, hydrocarbon emissions are generally too low to provide adequate NOx conversion, thus hydrocarbons are injected into the exhaust stream upstream of the lean NOx catalysts. SCR's are also capable of converting NOx to nitrogen. However, in contrast to using hydrocarbons for conversion, SCR's use reductants such as urea or ammonia that are injected into the exhaust stream upstream of the SCR's. NOx traps use a material such as barium oxide to absorb NOx during lean burn operating conditions. During fuel rich operations, the NOx is desorbed and converted to nitrogen by catalysts (e.g., precious metals) within the traps.

However, all of these NOx reductions methods rely on knowing the NOx level, usually by using a NOx sensor or engine-NOx-map for predication of engine-out NOx, so that the after treatment device can be more accurately controlled to its maximum potential performance. Unfortunately, both engine-NOx-maps and NOx sensors are either very expensive to develop or not entirely reliable for practical transient use.

What are needed are methods to predict NOx levels based on less expensive and widely available engine parameters.

SUMMARY

One inventive aspect of the present disclosure relates to methods for estimating the mass flow rate of NOx in an exhaust stream by correlating the level of NOx to an engine parameter. The level of NOx can be estimated as a function of engine power, of intake pressure, of the exhaust temperature, as a function of the percentage of $O_2$ in the exhaust stream, or as a combination of any of these. Once the level of NOx is approximately known, the exhaust system of the engine system can be modified to improve the removal efficiency of NOx and exhaust particulate matter from the exhaust stream. These methods for estimating the NOx mass flow rate can be used for an exhaust configuration that includes a lean NOx catalyst (LNC), a selective catalytic reduction (SCR) catalyst, or a lean NOx trap (LNT). Typically, a particulate filter is also present in the exhaust configuration.

DETAILED DESCRIPTION

Figure 1:
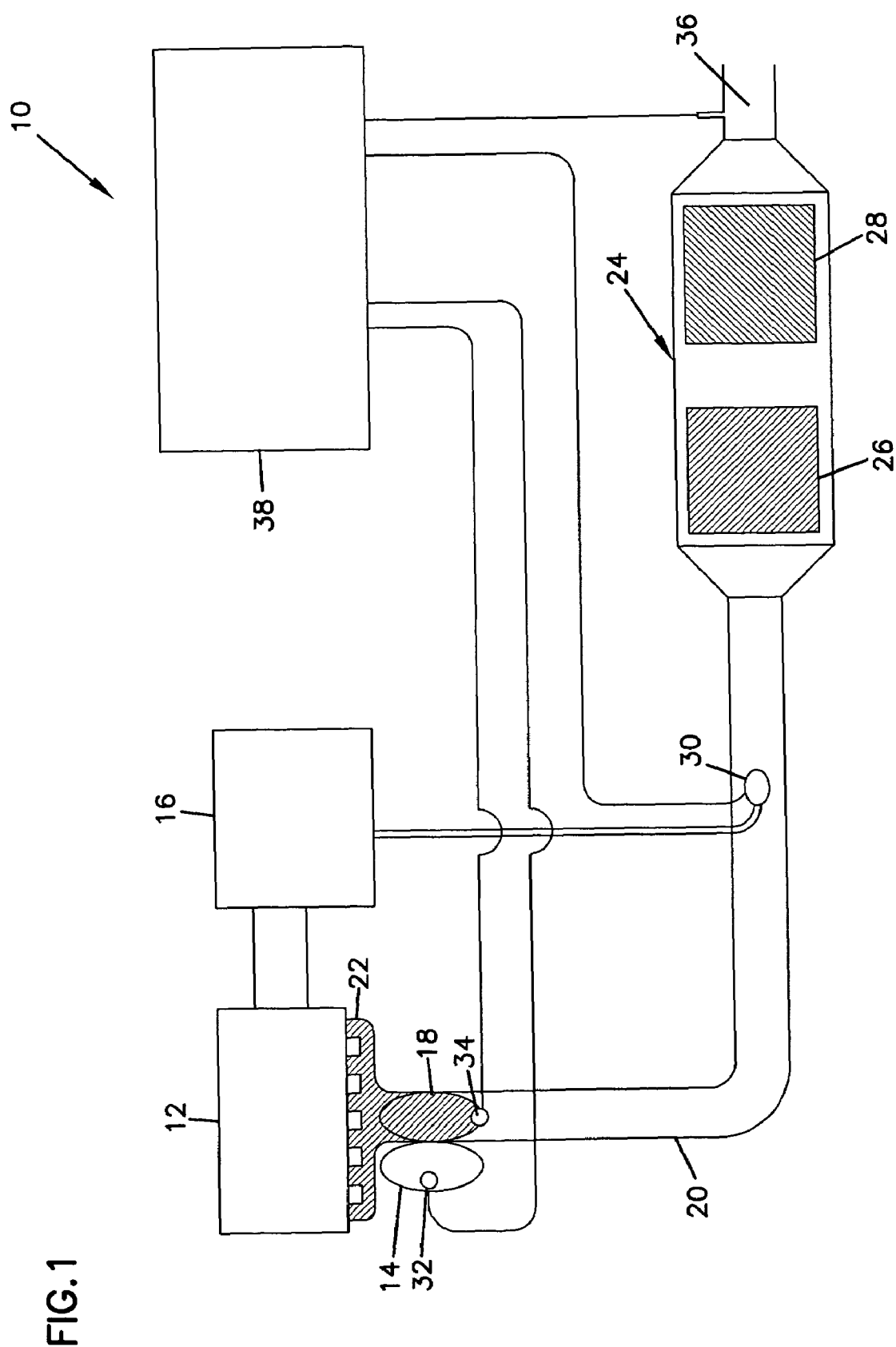
FIG. 1 schematically illustrates a first configuration of an exhaust system having features that are examples of inventive aspects in accordance with the principles of the present disclosure.

The present invention provides methods to predict NOx mass flow levels based on widely available engine parameters such as engine power, intake pressure, temperature of the exhaust stream, or percentage of $O_2$ in the exhaust stream. The technique involves using mathematical control models representative of the transient exhaust system to estimate or predict the level of NOx present in the exhaust stream. By approximately knowing the level of NOx present, the level of hydrocarbons present in the exhaust system can be adjusted for improved NOx removal by lean NOx catalysts and lean NOx traps. For SCRs, the level of urea in the exhaust system can be adjusted for improved NOx removal.

Using a mathematical control model to estimate the level of NOx present in the exhaust stream allows rapid aftertreatment control adjustment in response to variations in the operating conditions of the engine to obtain high efficiency in the removal of NOx. Using a mathematical control model removes the need for a large amount of testing to estimate the NOx level, as might be required by a strictly empirical modeling approach. To enhance the speed and flexibility of the mathematical control model, the model preferably relies upon a relatively small number of inputs (e.g., provided by sensors or other inputs) determined to have the most substantial effect on the operating conditions of the exhaust system. Thus, the system can effectively operate with a fewer number of input sources.

For exhaust system configurations having a lean NOx catalyst or lean NOx trap, hydrocarbons (such as diesel fuel) are added to the exhaust stream in order to obtain a more efficient removal of NOx and particulate matter from the exhaust stream. For exhaust system configurations having an SCR, urea is added to the exhaust stream to obtain a more efficient removal of NOx. The amount of fuel or urea added to the exhaust stream is dependent on the level of NOx present in the exhaust stream. Thus, this level of NOx present is generally a critical parameter to know.

Typically, the performance of new, factory-supplied engines is well characterized. This performance is captured in engine performance maps and stored in the engine control module (ECM). Engine manufacturers develop these maps through extensive dynamometer testing over possible operating conditions. These maps allow the ECM to monitor and control engine operation through a number of sensors which define the operating state. For instance, the amount of NOx produced by the engine at any operating condition can be estimated by the ECM. However, when retrofitting emissions reduction systems to in-use (e.g., existing) engines, NOx maps are not available. In-use engine-NOx maps are typically expensive to plot, and are not common. NOx sensors, for measuring the level of NOx in an exhaust stream, are very expensive to develop and generally not reliable for practical transient use. Thus, prior to the methods disclosed below, estimating the level of NOx in the exhaust stream of an in-use engine has been difficult. This invention provides mathematical formulas, based on widely available engine parameters, to estimate NOx levels; these engine parameters include engine power, intake pressure, exhaust temperature, and percentage of $O_2$ in the exhaust stream. The mathematical formulas may be based on one engine parameter or more than one engine parameters. Generally, when more than one parameters are used, one is a dominant parameter and the others are minor. The mathematical function typically uses the dominant parameter to estimate the NOx mass flow rate and the minor parameter(s) to set a cut-off criterion for the control.

The methods for estimating the NOx mass flow rate, as described below, can be used for an exhaust configuration that includes a lean NOx catalyst (LNC), a selective catalytic reduction (SCR) catalyst, a lean NOx trap (LNT), or any other exhaust element whose efficiency in NOx or particulate removal is a function of the level of NOx present in the exhaust stream.

It is noted that these methods can be used for systems operating with a hydrocarbon-based fuel source such as diesel fuel, or an alternative fuel (e.g., bio-diesel or fuel-water blended emulsions), with a surfactant or other additives adapted to keep the oxygenated hydrocarbons or water homogeneously dispersed in the base hydrocarbon. Other additives, such as lubricity enhancers, corrosion inhibitors, cetane improvers, may also be included in the fuel source depending on the application in which the system may be intended.

Engine Power

The level, or mass flow rate, of NOx in the exhaust stream can be estimated as a function of the engine's power output at any given moment during operation. A function has been determined that provides an approximate correlation between the actual NOx level and the estimated NOx level. This linear function has been modeled to be:

$$Y_1 = K_1 X_1 + K_2$$

where $Y_1$ is the estimated NOx mass flow level in mmol/second and $X_1$ is the engine output in horsepower (hp). The horsepower can be estimated using engine control module outputs or through measurement of parameters such as engine RPM, engine torque, manifold pressure, or rack setting.

$K_1$ is usually 0.020 to 0.040, and is preferably 0.025 to 0.035. $K_2$ is usually 0.50 to 2.0, preferably 0.50 to about 1.10. In one particular embodiment, when $K_1$ is 0.0252 and $K_2$ is 0.552, a correlation of 0.909 between the estimated NOx and actual (measured) NOx is obtained. In another embodiment, when $K_1$ is 0.025 and $K_2$ is 0.554, a correlation of 0.908 is obtained. In yet another embodiment, a correlation of 0.906 is obtained when $K_1$ is 0.0253 and $K_2$ is 0.569. In another embodiment, $K_1$ is 0.0252 and $K_2$ is 0.558. It will be appreciated that $K_1$ and $K_2$ values will change based on units of mass flow rate and engine torque.

Intake Pressure

The level of NOx can be estimated as a function of the engine's intake pressure at any given moment during operation. An engine's intake pressure is the incoming air pressure, measured at the air intake manifold. Intake pressure is often also referred to as boost pressure or manifold absolute pressure, MAP. A linear function to estimate the NOx mass flow rate has been modeled to be:

$$Y_2 = K_3 X_2 + K_4$$

where $Y_2$ is the estimated NOx mass flow level in mmol/second and $X_2$ is the engine intake pressure in PSI.

$K_3$ is usually 0.030 to 0.050, and is preferably 0.035 to 0.045. $K_4$ is usually 0.30 to 0.90, and is preferably 0.40 to 0.80. In a first specific embodiment, when $K_3$ is 0.365 and $K_4$ is 0.786, a correlation of 0.865 between the estimated NOx and actual (measured) NOx is obtained. In another embodiment, when $K_3$ is 0.365 and $K_4$ is 0.791, a correlation of 0.863 is obtained. In yet another embodiment, a correlation of 0.879 is obtained when $K_3$ is 0.373 and $K_4$ is 0.784. In still another embodiment, $K_3$ is 0.368 and $K_4$ is 0.787.

Exhaust Temperature

The level of NOx can be estimated as a function of the exhaust stream temperature at any given moment during operation. An exponential function, to estimate the NOx mass flow, has been modeled to be:

$$Y_3 = K_5 e^{K_6 X_3}$$

where $Y_3$ is the estimated NOx mass flow level in mmol/second and $X_3$ is the engine's turbo-outlet temperature in degrees Celsius.

$K_5$ is usually 0.010 to 0.20, and is preferably 0.015 to 0.10. $K_6$ is usually 0.0090 to 0.020, preferably 0.0090 to 0.012. In one particular embodiment, when $K_5$ is 0.0885 and $K_6$ is 0.00980, a correlation of $R^2 = 0.718$ between the estimated NOx and actual (measured) NOx is obtained. In another embodiment, a correlation of approximately $R^2 = 0.709$ is obtained when $K_5$ is 0.0910 and $K_6$ is 0.00970. In yet another embodiment, a correlation of approximately $R^2 = 0.741$ is obtained when $K_5$ is 0.0874 and $K_6$ is 0.00990. A yet further embodiment has $K_5$ as 0.089 and $K_6$ as 0.0098.

It will be appreciated that $K_5$ and $K_6$ values will change, depending on where the exhaust temperature is measured. This above values for $K_5$ and $K_6$ are for estimates when the exhaust temperature is measured at the turbocharger outlet. The exhaust temperature could alternately be measured upstream of the turbocharger, immediately after the manifold, and in other locations.

Oxygen Level

The level of NOx can be estimated as a function of the engine's oxygen ($O_2$) level at any given moment during operation. An exponential function has been determined to be:

$$Y_4 = K_7 e^{K_8 X_4}$$

where $Y_4$ is the estimated NOx level in mmol/second and $X_4$ is the oxygen level (as a percentage) in the outlet exhaust stream.

$K_7$ is usually 30 to 100, and is preferably 38 to 95. $K_8$ is usually −0.18 to −0.40, preferably −0.20 to −0.33. In one particular embodiment, a correlation of approximately $R^2 = 0.867$ between the actual NOx level and the estimated NOx level is obtained when $K_7$ is 40.3 and $K_8$ is −0.214. In another embodiment, a correlation of approximately $R^2 = 0.868$ is obtained when $K_7$ is 40.1 and $K_8$ is −0.214. In yet another embodiment, a correlation of approximately $R^2=0.854$ is obtained when $K_7$ is 39.6 and $K_8$ is −0.212. Yet another embodiment has $K_7$ as 40.0 and $K_8$ as −0.213.

Example Exhaust Configurations

Referring to the Figures, three exemplary exhaust systems, and positioning of various sensors, are described.

FIG. 1 illustrates an exhaust system 10 having a lean NOx catalyst (LNC) and a diesel particulate filter for both particulate matter and NOx reduction. Exhaust system 10 includes an engine 12 (e.g., a diesel engine) with an air intake 14, a fuel tank 16 for supplying fuel (e.g., diesel fuel) to engine 12, a turbocharger 18, and an exhaust conduit 20 for conveying exhaust gas away from engine 12 and turbocharger 18. Exhaust conduit 20 includes an exhaust manifold 22.

System 10 includes an exhaust control configuration 24 operably connected to exhaust conduit 20. In this system, configuration 24 includes a lean NOx catalyst (LNC) 26 and a particulate filter 28 (e.g., a diesel particulate filter).

LNC 26 catalyzes the reaction of NOx with hydrocarbons (e.g., diesel fuel) to form nitrogen ($N_2$), water and carbon dioxide ($CO_2$) in an oxygen-rich exhaust stream. This reaction is typically facilitated by catalytic material, often an alkaline metal oxide, base metal oxide, or precious metal. The catalytic material us generally present on a carrier or support, such as zeolites or alumina or other structure such as a cordierite honeycomb material. LNC is also commonly called "HC-SCR" (hydrocarbon-selective catalytic reduction).

Filter 28 (e.g., a diesel particulate filter) can have a variety of known configurations. An exemplary configuration includes a monolith ceramic substrate having a "honeycomb" configuration of plugged passages as described in U.S. Pat. No. 4,851,015, which is hereby incorporated by reference in its entirety. Wire mesh configurations can also be used. In certain embodiments, the substrate can include a catalyst. Exemplary catalysts include precious metals such as platinum, palladium and rhodium, and other types of components such as base metals or zeolites.

Filter 28 preferably has a particulate mass reduction efficiency greater than 50%. More preferably, the diesel particulate filter has a particulate mass reduction efficiency greater than 85%. Most preferably, filter 28 has an efficiency of at least 90%. Additionally, filter 28 may adsorb or otherwise reduce the level of hydrocarbons and carbon monoxide exiting from filter 28.

In this embodiment of system 10, LNC 26 is shown positioned upstream of filter 28, which is preferable, although it is understood that these elements could be switched. Having LNC 26 upstream of filter 28 facilitates the regeneration of filter 28.

A fuel supply device 30 is positioned in exhaust conduit 20 upstream of exhaust control configuration 24, to provide fuel from tank 16 into the exhaust stream as desired. Fuel supply device 30 may include a fuel injector and one or more spray nozzles.

Fuel supply device 30 preferably inputs fuel at a location between engine 12 and exhaust control configuration 24. Preferably, fuel supply device 30 inputs fuel to conduit 20 at a location immediately upstream of exhaust control configuration 24, in particular, upstream of LNC 26. Because for some engines (e.g., diesel engines), hydrocarbon levels in the exhaust stream are generally too low to provided adequate NOx conversion by LNC 26, fuel supply 30 is used to inject fuel into the exhaust stream traveling through conduit 20 upstream of LNC 26. In some engine and exhaust configurations, it may be desirable to inject fuel in the engine cylinders c post the normal engine combustion cycle, but prior to the exhaust reaching conduit 20. The fuel supplied by fuel supply device 30 reacts with NOx within LNC 26 to form nitrogen, water and carbon dioxide, thus reducing NOx levels and generating heat. The heat generated preferably raises the temperature of the exhaust gas exiting LNC 26 to a temperature above the combustion temperature of the particulate matter accumulated on filter 28, thus regenerating filter 28.

Various engine parameter sensors are positioned within system 10: intake pressure sensor 32 is illustrated positioned at the air intake port 14; temperature sensor 34 is illustrated positioned downstream of turbocharger 18, to measure the temperature of the exhaust out of turbocharger 18; and an oxygen sensor 36 is illustrated positioned downstream of exhaust control configuration 24. Each of these engine parameter sensors (i.e., intake pressure sensor 32, temperature sensor 34, and oxygen sensor 36) can be used alone, or in conjunction with one another or yet another engine parameter, to estimate the NOx mass flow rate in exhaust conduit 20. Data from these engine parameter sensors is sent to controller 38, which adjusts the amount of fuel added to the exhaust stream by fuel supply device 30.

Figure 2:
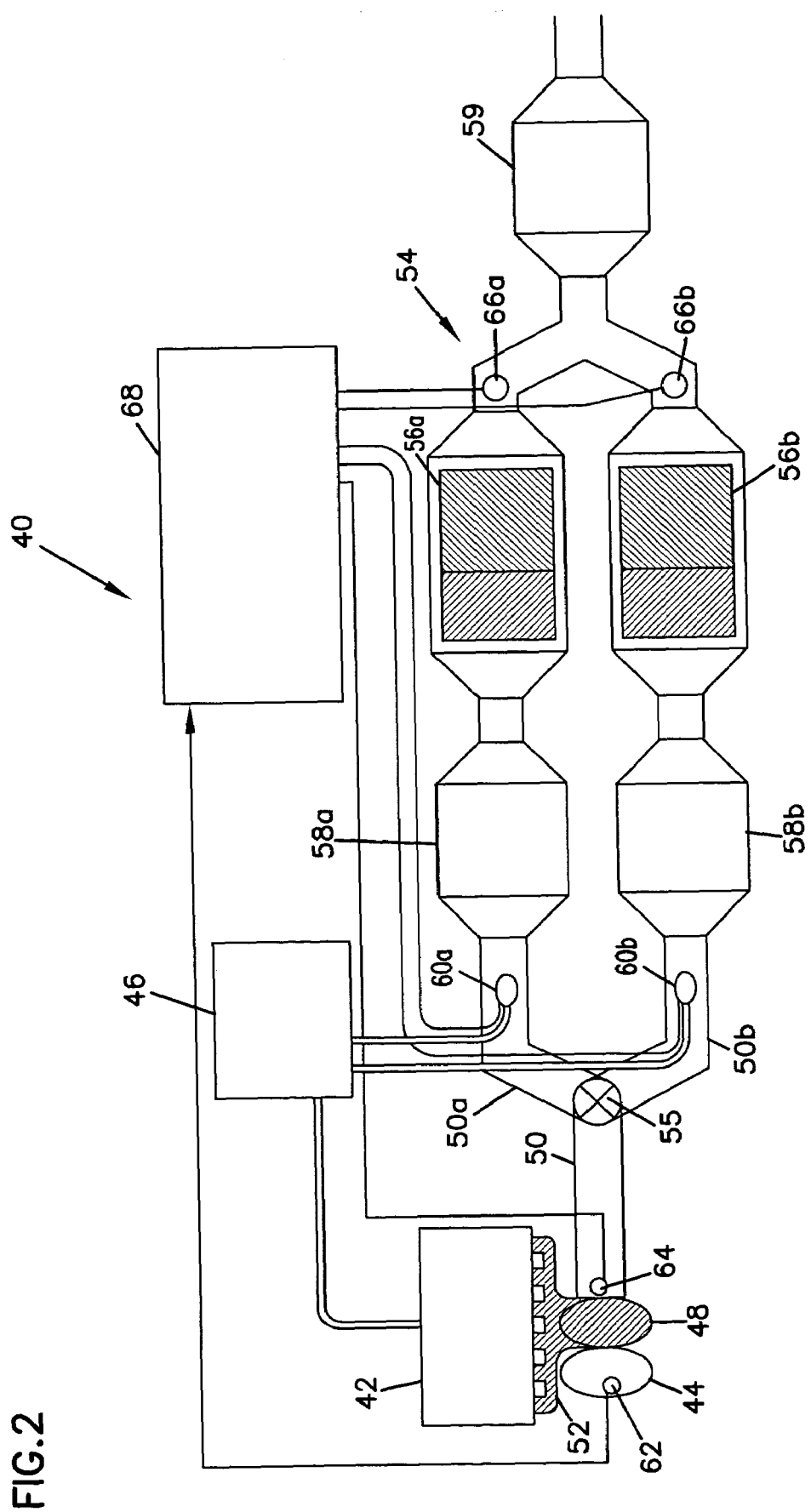
FIG. 2 schematically illustrates a second configuration of an exhaust system having features that are examples of inventive aspects in accordance with the principles of the present disclosure.

FIG. 2 illustrates an exhaust system 40 having a lean NOx trap (LNT), a diesel particulate filter, and a catalytic converter (e.g., DOC) for both particulate matter and NOx reduction. Exhaust system 40 includes an engine 42 (e.g., a diesel engine) with an air intake 44, a fuel tank 46 for supplying fuel (e.g., diesel fuel) to engine 42, a turbocharger 48, and an exhaust conduit 50 for conveying exhaust gas away from engine 42 and turbocharger 48. Exhaust conduit 50 includes an exhaust manifold 52.

System 40 includes an exhaust control configuration 54 operably connected to exhaust conduit 50. Exhaust control configuration 54 includes two parallel streams having the same elements. At the upstream end of exhaust control configuration 54, exhaust conduit 50 splits to a first conduit 50a and a parallel second conduit 50b. Each of these parallel streams of configuration 54 includes a lean NOx trap (LNT) 56a, 56b and a particulate filter 58a, 58b (e.g., a diesel particulate filter). Lean NOx traps use an adsorptive material, such as barium oxide, to adsorb NOx during lean burn operating conditions. During fuel rich operations, NOx is desorbed from the adsorptive material and converted to nitrogen, water and carbon dioxide by catalytic material within the trap. Heat is also generated by lean NOx traps during the conversion of NOx. In this embodiment, filter 58a, 58b is positioned upstream of LNT 56a, 56b. Having LNT 56a, 56b upstream of filter 58a, 58b facilitates the regeneration of filter 58a, 58b and also limits the formation of $NO_2$ through the system. LNT 56a, 56b is also commonly called an "NOx adsorber".

Lean NOx trap (LNT) 56a, 56b typically contains precious metals such as palladium, platinum or polonium, alkali or alkali earth metals, or alumina. A generally accepted pathway for reactions of LNT is that under lean conditions, NOx is oxidized to $NO_2$, which is followed by subsequent formation of a nitrate with alkali or alkali earth metal(s), e.g., barium. Under stoichiometric or rich operation, the stored nitrate is thermodynamically unstable. The stored $NO_2$ is released. The NOx then catalytically reacts with reducing species in the exhaust gas to form $N_2$.

Exhaust control configuration 54 also includes a catalytic converter (DOC) 59 downstream of where parallel conduits 50a, 50b rejoin. DOC 59 can have a variety of known configurations. Exemplary configurations include substrates defining channels that extend completely therethrough. Exemplary catalytic converter configurations having both corrugated metal and ceramic substrates are described in U.S. Pat. No. 5,355,973, what is hereby incorporated by reference in its entirety. The substrates preferably include a catalyst. For example, the substrate can be made of a catalyst, impregnated with a catalyst or coated with a catalyst. Exemplary catalysts include precious metals such as platinum, palladium and rhodium, and other types of components such as base metals or zeolites.

Within exhaust conduit 50, at the beginning of first conduit 50a and second conduit 50b, is a flow switch valve 55 to regulate the flow between first and second conduits 50a, 50b. Switch valve 55 is used to decrease the flow to one conduit when desired, for example, when regenerating LNT 56a, 56b.

A fuel supply device 60a, 60b, such as fuel injectors, is positioned in each exhaust conduit 50a, 50b downstream of switch valve 55 and upstream from exhaust control configuration 54 to provide fuel from tank 46 into the exhaust stream. In some engine and exhaust configurations, it may be desirable to inject fuel in the engine post the normal engine combustion cycle, but prior to the exhaust reaching conduit 50. Fuel supply device 60 may include a fuel injector and one or more spray nozzles.

Various engine parameter sensors are positioned within system 40: intake pressure sensor 62 is illustrated positioned at the air intake port 44; temperature sensor 64 is illustrated positioned downstream of turbocharger 48 within exhaust conduit 50, to measure the temperature of the exhaust out of turbocharger 48; and an oxygen sensor 66 is illustrated positioned downstream of exhaust control configuration 54. Each of these engine parameter sensors (i.e., intake pressure sensor 62, temperature sensor 64, and oxygen sensor 66) can be used alone, or in conjunction with another of these or yet another engine parameter, to estimate the NOx mass flow rate in exhaust conduit 50. Data from these engine parameter sensors is sent to controller 68, which adjusts the amount of fuel added to the exhaust stream by fuel supply device 60.

Figure 3:
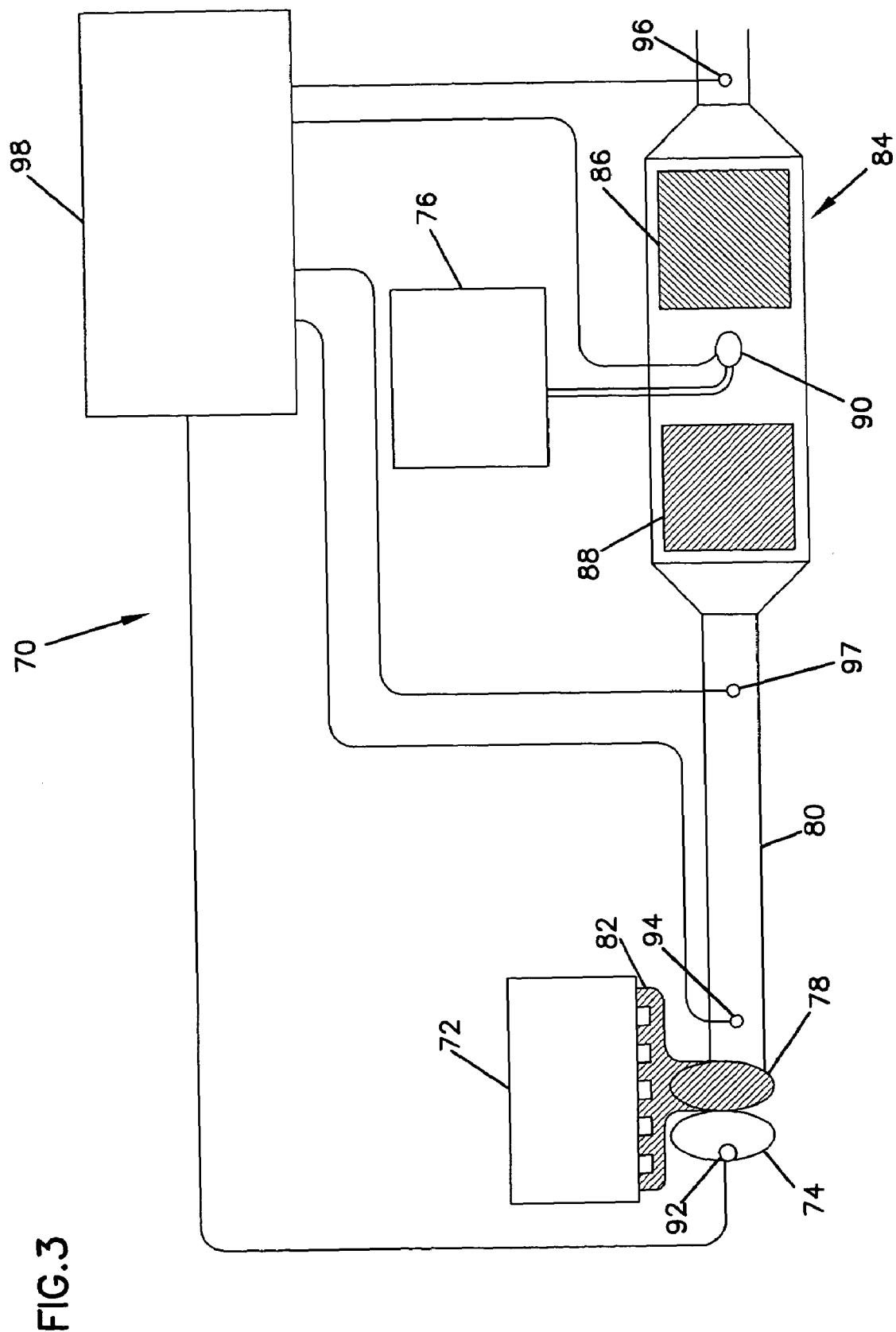
FIG. 3 schematically illustrates a third configuration of an exhaust system having features that are examples of inventive aspects in accordance with the principles of the present disclosure.

FIG. 3 illustrates an exhaust system 70 having a selective catalytic reduction catalyst (SCR) and a diesel particulate filter for both particulate matter and NOx reduction. Exhaust system 70 includes an engine 72 (e.g., a diesel engine) with an air intake 74, a turbocharger 78, and an exhaust conduit 80 for conveying exhaust gas away from engine 72 and turbocharger 78. Exhaust conduit 80 includes an exhaust manifold 82. Although not illustrated, system 70 includes a fuel tank for providing fuel to engine 72. System 70 includes a urea tank 76, the function of which is explained below.

System 70 includes an exhaust control configuration 84 operably connected to exhaust conduit 80. In this system, configuration 84 includes a selective catalytic reduction catalyst (SCR) 86 and a particulate filter 88 (e.g., a diesel particulate filter). Selective catalytic reduction, or SCR 86, is based on the reaction of NOx with ammonia species activated on the catalyst surface and the subsequent reduction of NOx to $N_2$ and water. More than fifty such SCR catalysts are conventionally known to exist. These include a wide assortment of catalysts, some containing base metals or precious metals that provide high activity. Tungsten oxide, vanadium oxide (vanadia) and titanium oxide (titania) are known catalysts that facilitate the conversion.

In this embodiment, SCR 86 is shown positioned downstream of filter 88, which is preferable, although it is understood that these elements could be switched. Having SCR 86 downstream of filter 88 prevents the injector tip used to add the reductant to SCR 86 from becoming clogged. A urea supply device 90 is positioned in exhaust 80 upstream of SCR 86 to provide urea from tank 76 into the exhaust stream to be used by SCR 86 for conversion of NOx to nitrogen and water. The working mechanism of SCR 86 can be illustrated by the chemical reaction $NO_2+NO+NH_2CONH_2 => 2N_2+2H_2O+CO_2$.

Various engine parameter sensors are positioned within system 70: intake pressure sensor 92 is illustrated positioned at the air intake port 74; temperature sensor 94 is illustrated positioned downstream of turbocharger 78, to measure the temperature of the exhaust out of turbocharger 78; an oxygen sensor 96 is illustrated positioned downstream of exhaust control configuration 84; and pressure sensor 97 is illustrated positioned upstream of exhaust control configuration 84. Each of these engine parameter sensors (i.e., intake pressure sensor 92, temperature sensor 94, oxygen sensor 96, and pressure sensor 97) can be used alone, or in conjunction with another or yet another engine parameter, to estimate the NOx mass flow rate in exhaust conduit 80. Data from these engine parameter sensors is sent to controller 98, which adjusts the amount of urea added to the exhaust stream by urea supply device 90.

It is to be understood that even though numerous characteristics and advantages of the present disclosure have been set forth in the foregoing description, together with details of the structure and function of the disclosure, the disclosure is illustrative only, and changes may be made in detail, especially in matters of arrangement of parts and types of materials within the principles of the disclosure to the full extent indicated by the broad general meaning of the terms in which the appended claims are expressed.

What is claimed:

1. A method for estimation of a NOx mass flow rate in a diesel engine exhaust stream, the method comprising:
   (a) using a mathematical function to estimate the NOx mass flow rate, the mathematical function being one of:
      (i) $Y=K_1X_1+K_2$, where Y is the estimated NOx mass flow level in mmol/second, $X_1$ is the engine output in horsepower, $K_1$ is a first constant, and $K_2$ is a second constant;
      (ii) $Y=K_3X_2+K_4$, where Y is the estimated NOx mass flow level in mmol/second, $X_2$ is the engine intake pressure in PSI, $K_3$ is a third constant, and $K_4$ is a fourth constant;
      (iii) $Y=K_5e^{K_6X_3}$, where Y is the estimated NOx mass flow level in mmol/second, $X_3$ is the engine's turbo-outlet temperature in degrees Celsius, $K_5$ is a fifth constant, and $K_6$ is a sixth constant; and
      (iv) $Y=K_7e^{K_8X_4}$, where Y is the estimated NOx mass flow level in mmol/second, $X_4$ is the percentage of oxygen in the engine's outlet exhaust stream, $K_7$ is a seventh constant, and $K_8$ is an eighth constant.

2. A method according to claim 1, wherein $K_1$ is about 0.020 to 0.040, and $K_2$ is about 0.50 to 2.0.

3. A method according to claim 2, wherein $K_1$ is about 0.025 to 0.035, and $K_2$ is about 0.50 to 1.10.

4. A method according to claim 1, wherein $K_3$ is about 0.030 to 0.050, and $K_4$ is about 0.30 to 0.90.

5. A method according to claim 4, wherein $K_3$ is about 0.035 to 0.045, and $K_4$ is about 0.40 to 0.80.

6. A method according to claim 1, wherein $K_5$ is about 0.010 to 0.20, and $K_6$ is about 0.0090 to 0.020.

7. A method according to claim 6, wherein $K_5$ is about 0.015 to 0.10, and $K_6$ is about 0.0090 to 0.012.

8. A method according to claim 1, wherein $K_7$ is about 30 to 100, and $K_8$ is about −0.18 to −0.40.

9. A method according to claim 8, wherein $K_7$ is about 38 to 95, and $K_8$ is about −0.20 to −0.33.

10. A method according to claim 1, further comprising using the estimated NOx mass flow rate as a parameter in controlling an exhaust treatment operation.

11. A method according to claim 10, wherein the exhaust treatment operation includes injection of reductants into the exhaust stream.

12. A method according to claim 10, wherein the exhaust treatment operation includes injection of hydrocarbons into the exhaust stream.

13. A method according to claim 10, wherein the exhaust treatment operation includes regeneration of an exhaust component.

14. A method of retrofitting an emission reduction system to an in-use, existing engine, the method comprising:
  (a) providing a sensor to measure a selected engine parameter of the in-use, existing engine and using a mathematical function of the selected engine parameter to estimate a NOx mass flow rate, the mathematical function being one of:
    (i) $Y=K_1X_1+K_2$, where Y is the estimated NOx mass flow level in mmol/second, $X_1$ is the engine output in horsepower, $K_1$ is a first constant, and $K_2$ is a second constant;
    (ii) $Y=K_3X_2+K_4$, where Y is the estimated NOx mass flow level in mmol/second, $X_2$ is the engine intake pressure in PSI, $K_3$ is a third constant, and $K_4$ is a fourth constant;
    (iii) $Y=K_5e^{K_6X_3}$, where Y is the estimated NOx mass flow level in mmol/second, $X_3$ is the engine's turbo-outlet temperature in degrees Celsius, $K_5$ is a fifth constant, and $K_6$ is a sixth constant; and
    (iv) $Y=K_7e^{K_8X_4}$, where Y is the estimated NOx mass flow level in mmol/second, $X_4$ is the percentage of oxygen in the engine's outlet exhaust stream, $K_7$ is a seventh constant, and $K_8$ is an eighth constant; and
  (b) using the estimated NOx mass flow rate as a parameter in controlling an exhaust treatment operation.

15. A method according to claim 14, wherein the exhaust treatment operation includes injection of reductants into the exhaust stream.

16. A method according to claim 14, wherein the exhaust treatment operation includes injection of hydrocarbons into the exhaust stream.

17. A method according to claim 14, wherein the exhaust treatment operation includes regeneration of an exhaust component.

* * * * *

UNITED STATES PATENT AND TRADEMARK OFFICE
CERTIFICATE OF CORRECTION

PATENT NO. : 7,155,331 B1
APPLICATION NO. : 11/012075
DATED : December 26, 2006
INVENTOR(S) : Zhang et al.

It is certified that error appears in the above-identified patent and that said Letters Patent is hereby corrected as shown below:

Col. 8, line 44, claim 1: "$Y\text{-}K_5 e^{K6X3}$, where" should read --$Y=K_5 e^{K6X3}$, where--

Col. 9, line 21, claim 14: "$Y\text{-}K_1 X_1 + K_2$, where" should read --$Y=K_1 X_1 + K_2$, where--

Signed and Sealed this
Twentieth Day of September, 2011

David J. Kappos
*Director of the United States Patent and Trademark Office*